(12) United States Patent  
Pettersson et al.

(10) Patent No.: US 11,962,908 B2
(45) Date of Patent: Apr. 16, 2024

(54) AUTOMATIC IMAGE FRAME PROCESSING POSSIBILITY DETECTION

(71) Applicant: Microsoft Technology Licensing, LLC, Redmond, WA (US)

(72) Inventors: Gustaf Pettersson, Lund (SE); Johan Windmark, Lund (SE)

(73) Assignee: Microsoft Technology Licensing, LLC., Redmond, WA (US)

( * ) Notice: Subject to any disclaimer, the term of this patent is extended or adjusted under 35 U.S.C. 154(b) by 339 days.

(21) Appl. No.: 14/660,611

(22) Filed: Mar. 17, 2015

(65) Prior Publication Data

US 2016/0277678 A1 Sep. 22, 2016

(51) Int. Cl.
*G03B 37/02* (2021.01)
*G06F 3/048* (2013.01)
*G06T 5/00* (2006.01)
*G06T 5/50* (2006.01)
*H04N 5/14* (2006.01)
*H04N 5/262* (2006.01)
(Continued)

(52) U.S. Cl.
CPC .......... *H04N 23/698* (2023.01); *G06F 3/048* (2013.01); *G06T 5/002* (2013.01); *G06T 5/003* (2013.01); *G06T 5/50* (2013.01); *H04N 5/145* (2013.01); *H04N 5/262* (2013.01); *H04N 5/2625* (2013.01); *H04N 23/631* (2023.01); *H04N 23/675* (2023.01); *H04N 23/70* (2023.01); *H04N 23/951* (2023.01); *G06T 2200/24* (2013.01); *G06T 2207/20182* (2013.01); *G06T 2207/20201* (2013.01); *G06T 2207/20221* (2013.01); *G06T 2210/61* (2013.01)

(58) Field of Classification Search
CPC .. H04N 5/23232; H04N 5/2625; H04N 5/145; H04N 5/23212; H04N 5/23238; H04N 5/23293; H04N 5/235; H04N 5/262; G06F 3/048; G06T 5/002; G06T 5/003; G06T 5/50; G06T 2200/24; G06T 2207/20182; G06T 2207/20201; G06T 2207/20221; G03B 17/20
See application file for complete search history.

(56) References Cited

U.S. PATENT DOCUMENTS 6,995,793 B1 2/2006 Albadawi et al.
7,317,558 B2 1/2008 Chiba
(Continued)

FOREIGN PATENT DOCUMENTS

CN 1416644 A 5/2003
CN 1848913 A 10/2006
(Continued)

OTHER PUBLICATIONS

"International Search Report and Written Opinion Issued in PCT Application No. PCT/US2016/021640", dated Jun. 10, 2016, 10 Pages.
(Continued)

*Primary Examiner* — Howard D Brown, Jr.
(74) *Attorney, Agent, or Firm* — Barta Jones, PLLC (57) ABSTRACT

In one example, a plurality of image frames captured by a digital camera unit are received. Received image frames may be still images or frames of a video sequence. Received image frames are automatically analyzed for detecting a possibility to process a plurality of image frames.

20 Claims, 6 Drawing Sheets

(51) Int. Cl.
*H04N 23/63* (2023.01)
*H04N 23/67* (2023.01)
*H04N 23/698* (2023.01)
*H04N 23/70* (2023.01)
*H04N 23/951* (2023.01)

(56) References Cited

U.S. PATENT DOCUMENTS

| | | | |
|---|---|---|---|
| 7,424,218 | B2 | 9/2008 | Baudisch et al. |
| 7,782,384 | B2 | 8/2010 | Kelly |
| 8,824,833 | B2 | 9/2014 | Dagher et al. |
| 8,830,380 | B2 | 9/2014 | Spielberg |
| 2006/0171702 | A1* | 8/2006 | Guillou ............... H04N 1/3876 396/310 |
| 2006/0221072 | A1 | 10/2006 | Se et al. |
| 2007/0025723 | A1* | 2/2007 | Baudisch ............. H04N 5/262 396/287 |
| 2008/0151075 | A1 | 6/2008 | Park |
| 2009/0022422 | A1 | 1/2009 | Sorek et al. |
| 2009/0263028 | A1 | 10/2009 | Kwon |
| 2011/0169987 | A1 | 7/2011 | Gann |
| 2012/0242853 | A1* | 9/2012 | Jasinski ............. H04N 5/23232 348/222.1 |
| 2013/0176458 | A1 | 7/2013 | Van Dalen et al. |
| 2014/0225985 | A1 | 8/2014 | Klusza et al. |
| 2014/0240453 | A1* | 8/2014 | Kim ....................... G03B 37/02 348/38 |
| 2014/0247325 | A1* | 9/2014 | Wu .................... H04N 5/23206 348/39 |
| 2014/0267833 | A1* | 9/2014 | Chen ..................... G06T 5/003 348/239 |
| 2014/0325439 | A1* | 10/2014 | Sohn ................... G06F 3/04845 715/810 |
| 2014/0333818 | A1 | 11/2014 | Sohn et al. |
| 2014/0354845 | A1* | 12/2014 | Molgaard ............ H04N 5/2621 348/222.1 |
| 2015/0035857 | A1* | 2/2015 | Lowe ............... H04N 5/232935 345/629 |

FOREIGN PATENT DOCUMENTS

| | | |
|---|---|---|
| CN | 101790046 A | 7/2010 |
| CN | 101902571 A | 12/2010 |
| WO | 2012173743 A1 | 12/2012 |
| WO | 2013136134 A1 | 9/2013 |

OTHER PUBLICATIONS

"Second Written Opinion Issued in PCT Application No. PCT/US2016/021640", dated Jan. 24, 2017, 6 Pages.
"Nokia introduces Nokia Lumia 925", Published on: May 14, 2013, Available at: http://company.nokia.com/en/news/press-releases/2013/05/14/nokia-introduces-nokia-lumia-925.
"Multi-Image Fusion", Published on: Mar. 9, 2010, Available at: http://research.microsoft.com/en-us/um/redmond/groups/ivm/multiimagefusion/.
"International Preliminary Report On Patentability Issued in PCT Application No. PCT/US2016/021640", dated Apr. 19, 2017, 7 Pages.
"Office Action Issued in European Patent Application No. 16713670.4", dated Jan. 11, 2019, 5 Pages.
"First Office Action And Search Report Issued in Chinese Patent Application No. 201680015608.9", dated Jul. 1, 2019, 13 Pages.
"Office Action Issued in Chinese Patent Application No. 201680015608.9", dated Mar. 26, 2020, 10 Pages.
"Office Action Issued in European Patent Application No. 16713670.4", dated Jan. 12, 2021, 5 Pages.
"Fourth Office Action Issued in Chinese Patent Application No. 201680015608.9", dated Jan. 13, 2021, 11 Pages.
"Third Office Action Issued in Chinese Patent Application No. 201680015608.9", dated Oct. 19, 2020, 11 Pages.
"Summons to attend Oral Proceedings Issued in European Patent Application No. 16713670.4", dated Jul. 8, 2021, 5 pages.
"Notice of Allowance Issued in European Patent Application No. 16713670.4", dated Mar. 28, 2022, 7 Pages.

* cited by examiner

AUTOMATIC IMAGE FRAME PROCESSING POSSIBILITY DETECTION

BACKGROUND

Digital cameras often have special shooting modes for combining a plurality of pictures. For example, a digital camera may have a special shooting mode for producing a panorama picture. Similar functionality may be implemented in an image viewing or image processing program. The user of the program chooses the combination mode, such as panorama, action shot or motion focus, and images that are combined into one new image. Moreover, various mobile apparatuses, such as smartphones and tablet computers, may incorporate digital cameras or computer programs with such combination functionality.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one example, an apparatus comprises a digital camera unit, at least one processor, and at least one memory storing program instructions that, when executed by the at least one processor, cause the apparatus to: receive a plurality of image frames captured by the digital camera unit, wherein said plurality of image frames are captured in a same capturing session, analyze automatically said received plurality of image frames, and based on said analyzing determine a possibility to process at least one image frame from said received plurality of image frames.

In another example, a method and a computer program product will be discussed along with the features of the apparatus.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although some of the present examples may be described and illustrated herein as being implemented in a smartphone or a tablet computer, these are only examples of an apparatus and not a limitation. As those skilled in the art will appreciate, the present examples are suitable for application in a variety of different types of apparatuses incorporating a digital camera module or a digital imaging system, for example, a stand-alone digital camera device, e.g. a compact camera, a SLR (Single-Lens Reflex) camera, or a mirrorless interchangeable-lens camera.

In the following description, the term 'capturing program' is used to mean a capturing mode of a camera or computer program used to capture image frames. The capturing program may include a still image capture mode, a video capture mode and a combined still image and video capture mode. These camera modes may have different requirements regarding automatic detection of possible image combinations. In the following description, the term 'image viewing program' is used to mean a computer program or software used for viewing images. In addition to image viewing programs that can be used only for viewing, the term is used herein to mean image viewing programs that are used for viewing and processing images. Typically, the difference between image viewing programs and image processing programs is that image viewing programs are designed for easy and fast viewing and may include some processing capabilities, while image processing programs are designed to include more complex processing possibilities. However, some image processing features have been typically introduced to advanced viewing programs so that the user can easily make small modifications. Thus, the term 'image viewing program' is used herein to mean programs that can be used for viewing images with or without processing features. In the following description, the term 'process' is used to mean any processing that can be performed on captured image frames including combining two or more image frames into one combined image, choosing at least one image from a plurality of captured image frames for further processing, discarding at least one image from a plurality of captured image frames, correcting capturing parameters to correspond with other image frames captured in the same capturing session and similar.

Figure 1:
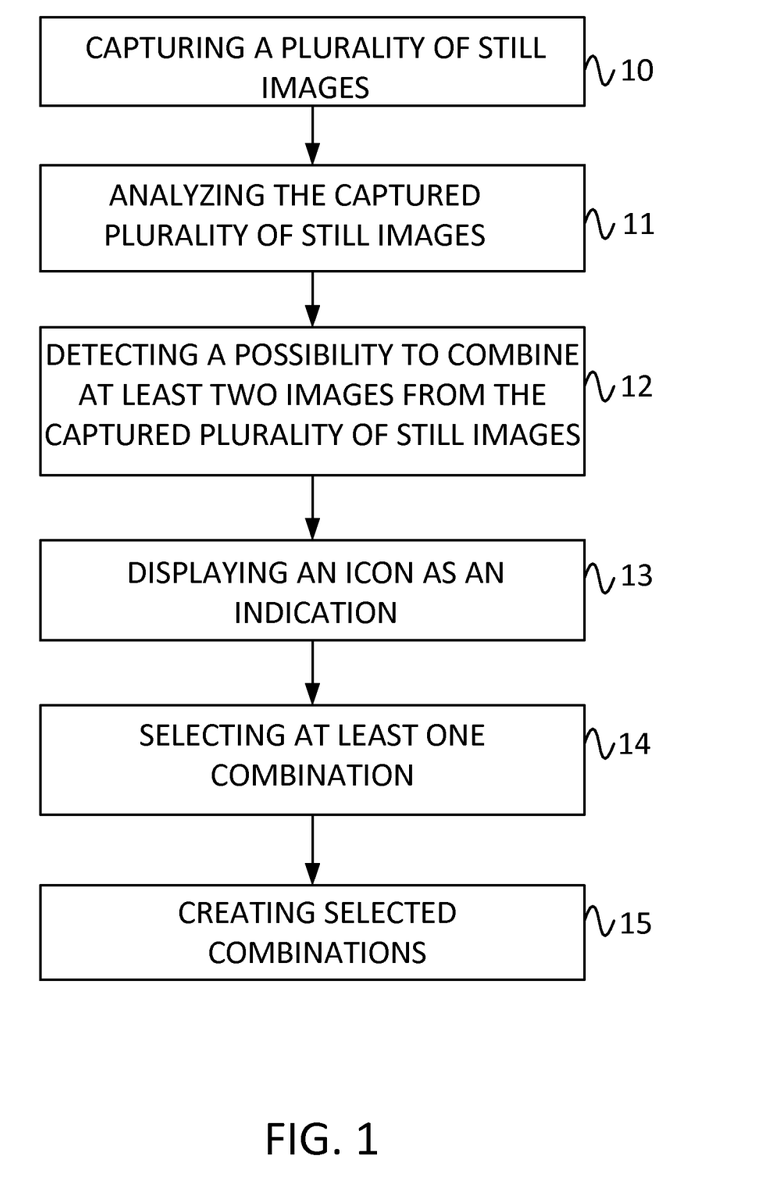
FIG. 1 is a flow diagram of one example of a method.

FIG. 1 shows a method which can be used in a capturing program. In the method, a plurality of still images are first captured, step 10. The plurality of still images may be captured by using a capturing program in a mobile communication device including a camera unit. In the example of FIG. 1, a person using the mobile communication device captures a plurality of images, for example views from a vantage point.

Then, in step 11, the captured images are analyzed for finding combination possibilities. The analysis may involve metadata analysis and image content analysis. The metadata analysis is typically used for limiting the number of images or image frames that need to be processed. The metadata analysis may involve, for example, an analysis based on capturing time. Instead of capturing time, it may be decided that ten previous images are analyzed, or similar. In some devices it is possible to detect different capturing sessions, for example, by using position and/or orientation sensors. In such case, the images may be limited based on information received from sensors. As a result, a number of pictures will be chosen for image content analysis. The images are analyzed for finding corresponding features, such as objects or edges of objects, that can be used when combining images. For example, if the person mentioned above has taken a plurality of still images of a mountain range, the plurality of images may be processed in order to detect a possibility to combine two or more still images into a panorama image, step 12.

If it is possible to combine two or more still images into a panorama image, an indication of a possible combination is shown, step 13. As in the example of FIG. 1, a capturing program is used and the captured still images are analyzed automatically immediately after capturing, so it is possible to show an indication of combination possibilities already when capturing images, for example by displaying an icon on the screen of the capturing device. By displaying the icon, the user of the device becomes aware of possibilities that might be otherwise unintentionally ignored.

The combination possibilities are displayed to the user of the capturing device when the icon is clicked. It is possible that, in the analysis step, a plurality of different combinations are detected. Furthermore, it is possible that some of the captured images are not included in combination options. For example, if the person has been capturing a panorama and in between decides to capture an image of a car passing by, the image of the car may be omitted from options as it cannot be combined to the panorama. Another example is an image where an automatic exposure function has, for some reason, applied a completely different exposure setting so that the image cannot be used.

From the displayed combination possibilities, the user may select which combination or combinations she or he wants to create, if any, step 14. Then, selected combinations are created according to the selection, step 15.

In the embodiment of FIG. 1, the analyzing step 11 may be limited to images captured in the same session that was initiated by starting the capturing program. However, the limitation may also be based on time stamps, the number of previous images, or other means to limit the number of analyzed images so that all images of the capturing session are analyzed; however, at the same time it is desired that not too many images from different sessions will be analyzed. For example, images captured during last two minutes may be analyzed or ten previous images may be included in the analysis. The limitation may be permanently set or the user of the device may change it.

Figure 2:
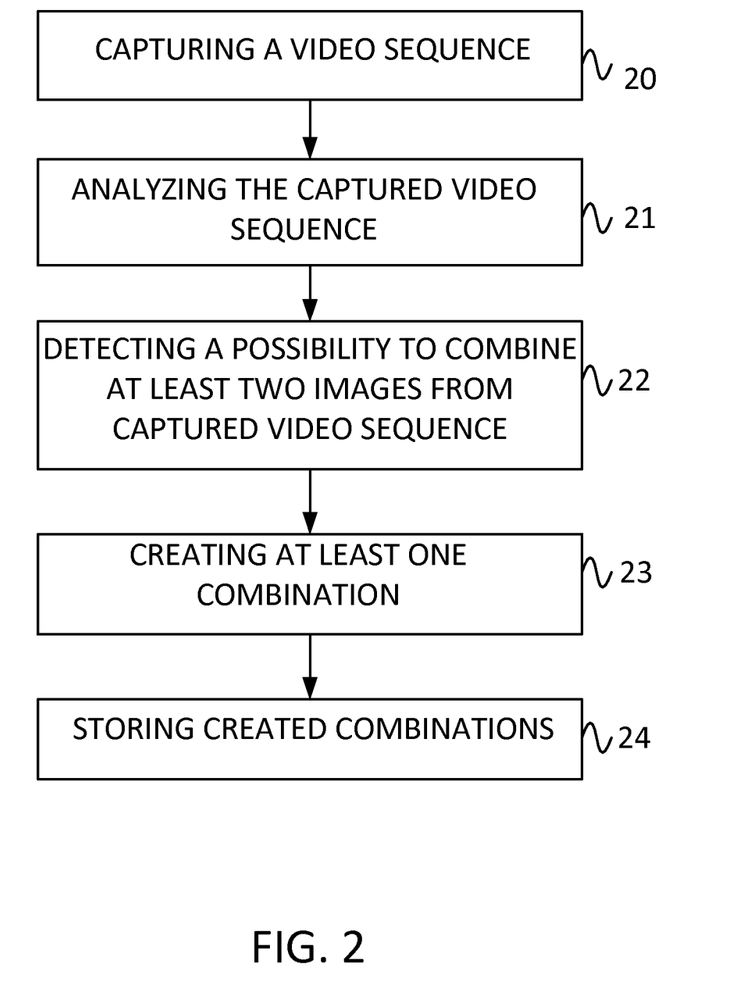
FIG. 2 is a flow diagram of another example of a method.

FIG. 2 shows another method which can be used in a capturing program. In the method, a video sequence is captured by using the capturing program, step 20. The video sequence may be captured by using a capturing program in a mobile communication device including a camera unit suitable for capturing a video sequence. In the example of FIG. 2, a person using the mobile communication device captures a video sequence, for example a sequence from a sports competition.

Image frames of the captured video sequence are then analyzed, step 21. The analysis may be initiated immediately after capturing the video sequence has been started. Image frames of the sequence are extracted from the video sequence and processed as explained above with regard to still images. In the case of a video sequence, the limitation discussed above may be provided on a sequence basis. Thus, image frames from one video sequence are analyzed.

When the image frames have been analyzed, the possibility to combine some of the image frames into a combined still image, for example an action shot, is detected, step 22. When detecting combinations of image frames extracted from a video sequence, some of the image frames may be omitted. For example, in the case of an action shot, it is desired that the followed object, for example a soccer player, moves enough that in the resulting action shot the soccer player is shown multiple times in different locations. Typically, these locations are chosen so that they are not overlapping with each other.

In the example of FIG. 2, the possible combinations are created immediately when the capturing and analysis have been finished, step 23. The number of combinations to be created may be limited, for example based on storage capacity or computing capacity. Created combinations are stored temporarily so that they can be later shown to the user, step 24.

The stored combinations may be shown to the user, for example in the image viewing program. The image viewing program may include a feature by which the stored combinations are shown to the user so that the user may select which combinations are stored permanently. Instead of temporary storage, the images may be stored permanently after creation. In this embodiment, the user deletes unnecessary images later.

Figure 3:
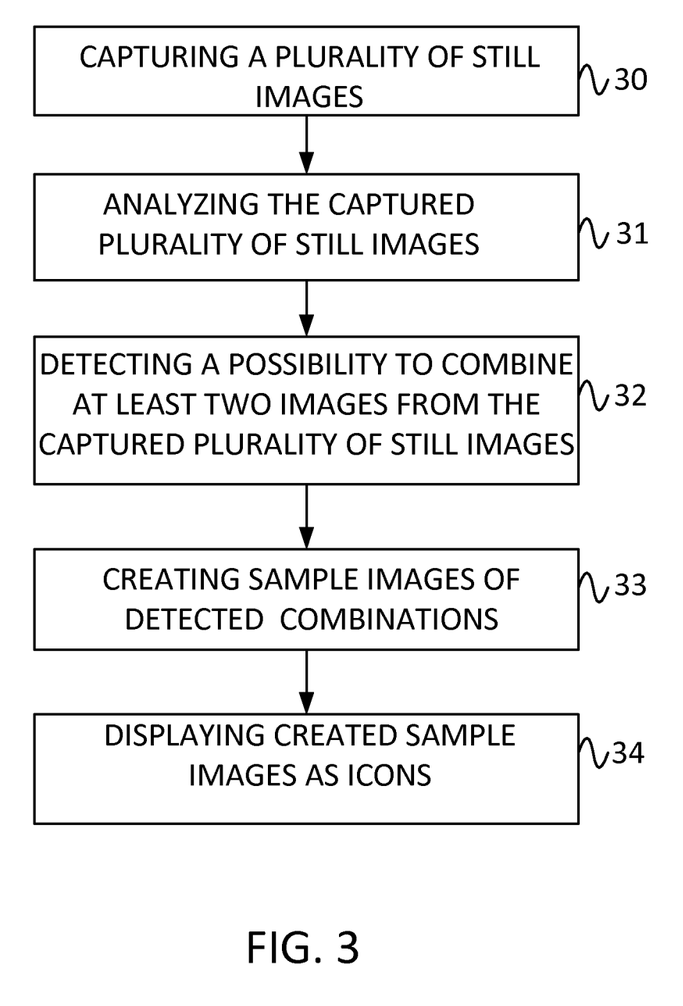
FIG. 3 is a flow diagram of another example of a method.

FIG. 3 shows another method which can be used in a capturing program. In the method, a plurality of still images are first captured, step 30. The plurality of still images may be captured by using a capturing program in a mobile communication device including a camera unit. In the example of FIG. 3, a person using the mobile communication device captures a plurality of images, for example of a child running on a field.

Again, captured images are analyzed as explained above, step 31. In the embodiment of FIG. 3, it is possible that captured images may be combined in different ways. For example, it is possible to create a panorama where the child is running, an action shot where the child is running in multiple places, a combined panorama and action shot, a motion focus image, or similar. The possible combinations are detected after analysis, step 32.

After detecting possible combinations, a sample of each combination, or combination type, may be produced. For example, if it is possible to create panorama, action shot and motion focus images, a sample of each is produced, step 33. The samples may be stored for later use or they may be scaled so that they can be used as an icon for indicating the possibility to the user. As the samples are conveniently displayed as icons, step 34, on the screen of the capturing device, it is easy for the user to choose which combination she or he wants to create. It is possible to choose more than one icon at a time or, if the user decides first to choose one combination, it is possible to return to other combinations.

In the example above, three icons were displayed to the user. It is possible to display all available combinations or to limit the number of displayed icons according to the user preferences.

In the examples above, an icon or created images are used as an indication of possible combinations; however, other indications may also be used. For example, a light emitting diode (LED) or sound may be used as an indication. When created images are used as an indication, it is possible to create separate indication images that are of lower quality than the final images. This is particularly beneficial if the capturing device, such as a mobile phone or a compact camera, does not have enough computing power to produce full quality images in short time.

In some of the examples described above, one indication is discussed together with one possible image combination type; however, the image combination types and indications can be combined as the user or designer of the device or software wishes. For example, when displaying one icon, it is possible to display any possible combination in the icon, or if a generic information icon is displayed, any image combination type may be created by clicking the icon.

Figure 4:
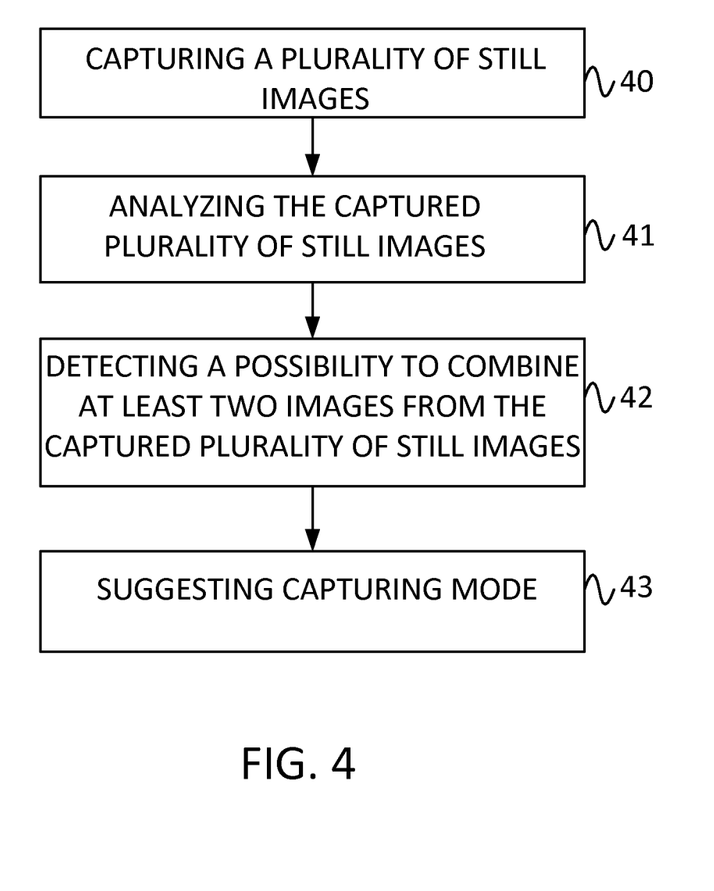
FIG. 4 is a flow diagram of another example of a method.

FIG. 4 shows another method which can be used in a capturing program. In the method a plurality of still images are first captured, step 40. The plurality of still images may be captured by using a capturing program in a mobile communication device including a camera unit. Again, captured images are analyzed as explained above, step 41. Corresponding to the embodiment of FIG. 3, also in the embodiment of FIG. 4 it is possible that captured images may be combined in different ways. For example, it is possible to create a panorama where the child is running, an action shot where the child is running in multiple places, a combined panorama and action shot, a motion focus image, or similar. The possible combinations are detected after analysis, step 42.

When at least one possibility for combination has been detected, a specific capturing mode may be suggested to the user, step 43. For example, when two overlapping image frames have been captured, a panorama capturing mode may be suggested so that the user notices that there is possibility to capture a panorama and continues capturing image frames that can be used in a panorama. If the user of the device follows the suggestion captured image frames may then be post processed in order to form a panorama. Even if the example of FIG. 4 suggesting a capturing mode is described together with still images the captured image frames may be extracted from a video and the video capturing mode may suggest capturing more image frames that can be used in a panorama or other combination. If there are more than one possible combinations, the user may choose which capturing mode is desired, if any. The specific capturing mode may include features that help the user in capturing or improve the quality of the resulting picture. These features may be, for example, implemented as instructions that are shown on the screen of the device or viewfinder of a camera.

In above embodiments, the detection of possible combinations is implemented in a capturing program; however, it may also be implemented in an image viewing program or image processing program. For example, if a user opens a folder comprising image frames, still images, video sequences or other forms of image data, they may be analyzed in accordance with the principles discussed above. The program is configured to detect which image frames have been captured in the same capturing session and will analyze and process them as explained in the embodiments of FIGS. 1-3.

Figure 5:
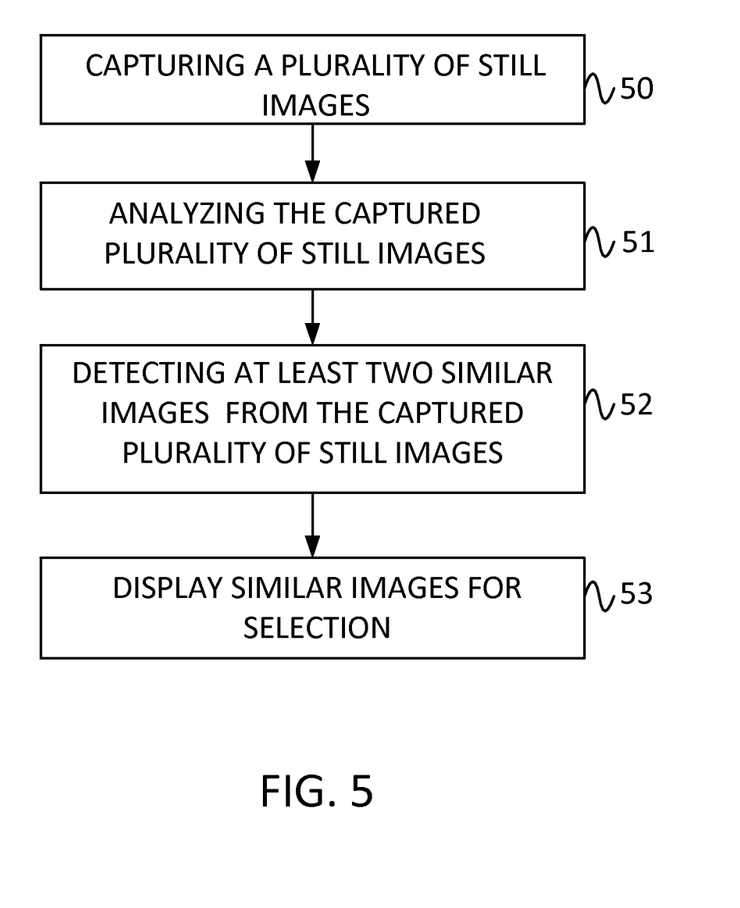
FIG. 5 is a flow diagram of another example of a method.

FIG. 5 shows another method which can be used in a capturing program. In the method a plurality of still images are first captured, step 50. The plurality of still images may be captured by using a capturing program in a mobile communication device including a camera unit. Again, captured images are analyzed as explained above, step 51.

In the example of FIG. 5 a plurality of images of a same object are captured. For example, when capturing a family portrait typically a plurality of images are captured so that the plurality comprises at least one good image. In the example of FIG. 5 the images of the same object, the family portrait, are detected, step 52. This may be achieved, for example, by setting a threshold so that when 90% of the image is similar with the following or previous image it is considered to be of same object. Then the images are displayed on a display, step 53. The images may be displayed immediately in the capturing program or an indication of possibility may be displayed as explained above. From the displayed images the user of the device can easily select the best image to be saved, or when desired more than one image. For example, the user may discard the images where at least one person has closed eyes. The possibility to choose may be indicated or provided when the capturing session is over. In an another embodiment it is possibility to choose may be indicated or provided already during the capturing session, for example, every time when a new similar image frame has been detected. In another embodiment the possibility choose is detected simultaneously during the capturing session, however, it is provided or indicated to the user only after the capturing session is over.

In a further embodiment the result of the analysis step 51 is used to pre-sort the images. For example, the capturing software may detect closed or red eyes and show other options before lower ranked ones.

In the examples above, the term 'panorama' is used to mean an image with elongated fields of view. In the examples above, the term 'action shot' is used to mean a method of capturing an object in action and displaying it in a single image with multiple sequential appearances of the object. In the examples above, the term 'motion focus' is used to mean a method of capturing an object in action and displaying it so that the object is in focus and background is blurred according to the movement. These three are only examples and also other combinations may be used in the examples described above. For example, instead of panorama, a plurality of images or image frames may be combined into one larger image, or two or more image frames or images having an only partially correct focus may be combined into one image having a correct focus. In addition to the combinations mentioned above post processing a plurality of image frames without combining may be performed. One example of such post processing was explained with referral to FIG. 5, however, also other processing possibilities may be provided.

Figure 6:
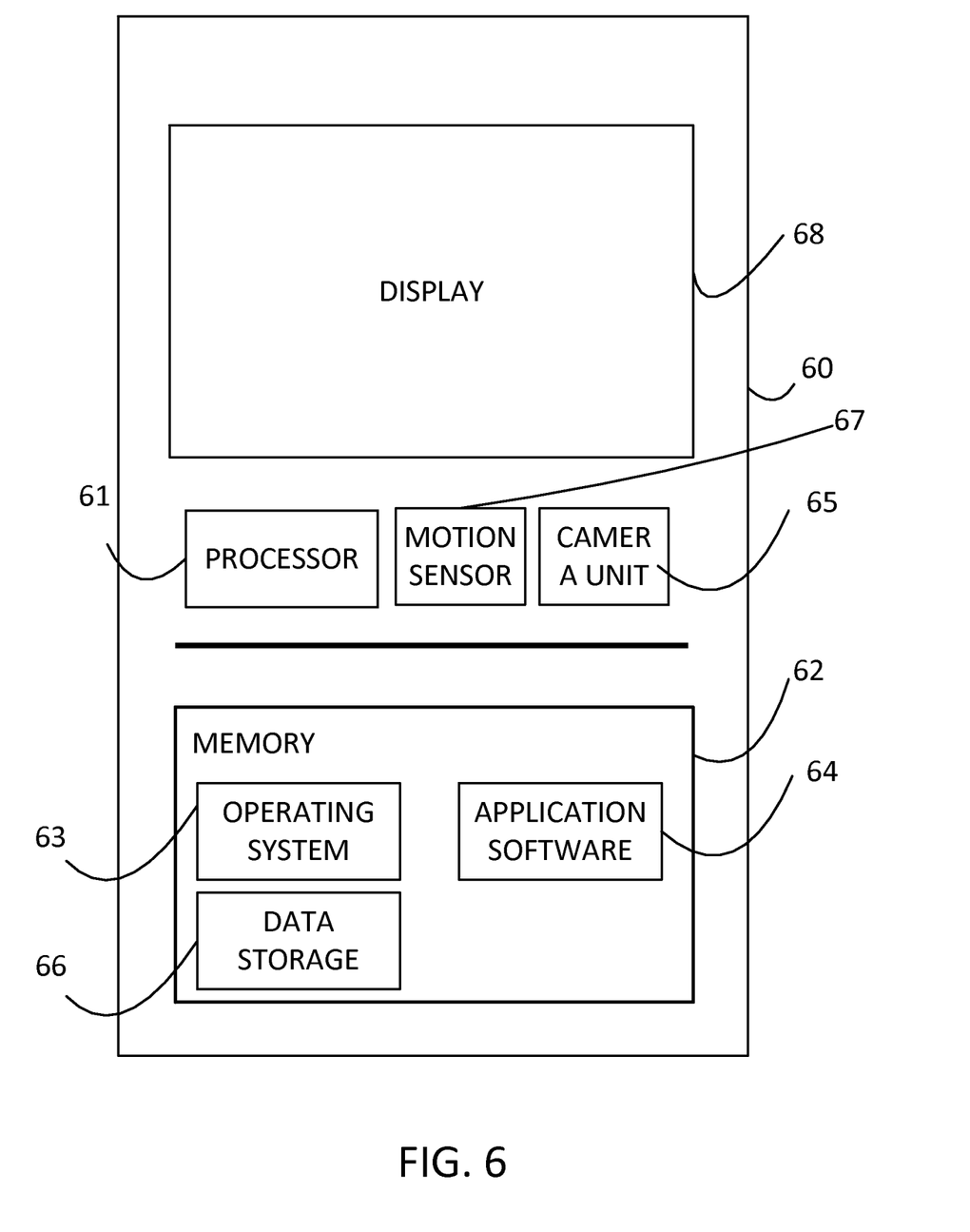
FIG. 6 is a block diagram of one example of an apparatus.
Like reference numerals are used to designate like parts in the accompanying drawings.

FIG. 6 shows a block diagram of one example of an apparatus 60 which may be implemented as any form of a computing device and/or electronic device that incorporates a digital camera module or a digital imaging system. For example, the apparatus 60 may be implemented as a stand-alone digital camera device, e.g. a compact camera, a SLR camera, or a mirrorless interchangeable-lens camera, or the apparatus 60 may be implemented e.g. as a smartphone or a tablet computer.

The apparatus 60 comprises a digital camera unit 65. The apparatus 60 further comprises at least one processor 61, and at least one memory 62. Stored in the at least one memory 62 are program instructions 63, 64 that, when executed by the at least one processor 61, cause the apparatus 60 to: receive a plurality of image frames captured by the digital camera unit, wherein said plurality of image frames are captured in a same capturing session, analyze automatically said received plurality of image frames; and based on said analysis determine a possibility to combine at least two image frames from said received plurality of image frames into one image.

In addition to the program instructions 63, 64, the memory 62 comprises a data storage 66, for example for storing captured image frames, such as still images or video sequences.

The digital camera unit 65 comprises at least an optical system including a lens arrangement and an image sensor, such as a charge-coupled device (CCD) sensor or a complementary metal-oxide-semiconductor (CMOS) sensor.

The at least one memory 62 may further store program instructions that, when executed by the at least one processor 61, cause the apparatus, in response to a determined possibility to combine at least two image frames, to provide an indication of the possibility to make the combination. The indication may be an icon displayed on the display 68. In one embodiment, a sample image is created and used as an icon. In another embodiment, the indication is a sound. In a further embodiment, the indication is provided by blinking a light emitting diode (LED).

The at least one memory 62 may further store program instructions that, when executed by the at least one processor 61, cause the apparatus, in response to a determined possibility to combine at least two image frames, to combine at least two image frames from said received plurality of image frames into at least one combined image. The at least one combined image may then be stored in the memory 62.

As discussed above, the apparatus 60 comprises one or more processors 61 which may be microprocessors, controllers or any other suitable type of processors for processing computer executable instructions to control the operation of the apparatus 60. Platform software comprising an operating system 63 or any other suitable platform software may be provided for the apparatus 60 to enable application software 64 to be executed on the device. The application software 64 may include e.g. software used in operating the camera unit 65.

In an embodiment, the apparatus 60 comprises an orientation sensor 67 that is used in detecting orientation of the apparatus during capturing sessions. Orientation sensor may be, for example, compass, accelerometer, gyroscope or a similar or any combination of those. Based on the movement of the apparatus 60, it may be possible to detect which still image frames have been captured during the same capturing session.

In an example an apparatus comprises a digital camera unit, a display at least one processor, and at least one memory storing program instructions that, when executed by the at least one processor, cause the apparatus to receive a plurality of image frames captured by the digital camera unit, wherein said plurality of image frames are captured in a same capturing session, analyze automatically said received plurality of image frames and based on said analysis determine a possibility to process at least one image frame from said received plurality of image frames. In an embodiment at least one memory of said apparatus further stores program instructions that, when executed by the at least one processor, cause the apparatus, in response to a determined possibility to process at least one image frame, to provide an indication of the possibility to process at least one image frame. In an embodiment an icon is displayed on said display as an indication of a possibility to process.

In an embodiment said at least one memory of said apparatus further stores program instructions that, when executed by the at least one processor, cause the apparatus, in response to a determined possibility to combine at least two image frames, to combine at least two image frames from said received plurality of image frames into at least one combined image. In an embodiment said at least one memory of said apparatus further stores program instructions that, when executed by the at least one processor, cause the apparatus to store said combined image in said memory. In an embodiment said at least one memory of said apparatus further stores program instructions that, when executed by the at least one processor, cause the apparatus to display said at least one combined image in an icon on said display as an indication of the possibility to make the combination. In an embodiment possibility to process comprises detecting one of panorama, action shot and motion focus as a possible combination. In an embodiment said possibility to process comprises best shot selection.

In an example a method, comprises receiving a plurality of image frames captured by the digital camera unit, wherein said plurality of image frames are captured in a same capturing session, analyzing automatically said received plurality of image frames and based on said analyzing determining a possibility to process at least one image frame from said received plurality of image frames.

In an embodiment the method further comprises providing an indication of the possibility to process in response to a determined possibility to post process at least one image frame. In an embodiment an icon is displayed as an indication on a display. In an embodiment the method further comprises combining at least two image frames from said received plurality of image frames into at least one combined image in response to a determined possibility to combine at least two image frames. In an embodiment the method further comprises storing said combined image in a memory and displaying said at least one combined image in an icon on a display as an indication of the possibility to make the combination.

In an example a computer-readable storage medium comprising executable instructions for causing at least one processor of a computing apparatus to perform operations comprising receiving a plurality of image frames captured by the digital camera unit, wherein said plurality of image frames are captured in a same capturing session, analyzing automatically said received plurality of image frames and based on said analyzing determining a possibility to process at least one image frame from said received plurality of image frames. In an embodiment said executable instructions for causing at least one processor of a computing apparatus to perform operations further comprise providing an indication of the possibility to process in response to a determined possibility to process at least one image frame. In an embodiment said executable instructions for causing at least one processor of a computing apparatus to perform operations further comprise displaying an icon as an indication of a possibility to process on a display.

In an embodiment said executable instructions for causing at least one processor of a computing apparatus to perform operations further comprise combining at least two image frames from said received plurality of image frames into at least one combined image in response to a determined possibility to combine at least two image frames. In an embodiment said executable instructions for causing at least one processor of a computing apparatus to perform operations further comprise storing said combined image in a memory. In an embodiment said executable instructions for causing at least one processor of a computing apparatus to perform operations further comprise displaying said at least one combined image in an icon on a display as an indication of the possibility to make the combination. In an embodiment said executable instructions for causing at least one processor of a computing apparatus to perform operations further comprise displaying similar images from said received plurality of image frames.

Computer executable instructions may be provided using any computer-readable media that are accessible by the apparatus 60. Computer-readable media may include, for example, computer storage media such as a memory 62 and communications media. Computer storage media, such as a memory 62, include volatile and non-volatile, removable and non-removable media implemented in any method or technology for storage of information such as computer readable instructions, data structures, program modules or other data. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media do not include communication media. Therefore, a computer storage medium should not be interpreted to be a propagating signal per se. Propagated signals may be present in computer storage media, but propagated signals per se are not examples of computer storage media. Although the computer storage media (memory 62) are shown within the apparatus 60, it will be appreciated that the storage may be distributed or located remotely and accessed via a network or other communication link.

An embodiment of a computer-readable storage medium comprises executable instructions for causing at least one processor of an apparatus to perform operations comprising: receiving a plurality of image frames captured by the digital camera unit, wherein said plurality of image frames are captured in a same capturing session, analyzing automatically said received plurality of image frames and based on said analyzing determining a possibility to combine at least two image frames from said received plurality of image frames into one image.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include mobile telephones (including smart phones), tablet computers and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An apparatus, comprising:
    a digital camera unit configured to capture images in a first image capturing mode and a second image capturing mode;
    a display;
    at least one processor; and
    at least one memory storing program instructions that, when executed by the at least one processor, cause the apparatus to:
    receive a plurality of image frames captured by the digital camera unit in the first image capturing mode, wherein the plurality of image frames are captured in a same capturing session; and prior to processing the received plurality of image frames in the first image capturing mode:
analyze, automatically, the received plurality of image frames captured in the first image capturing mode;
based at least on the analyzing, suggest, to a user, the second image capturing mode to process at least one image frame from the received plurality of image frames captured in the first image capturing mode, the first image capturing mode being different than the second image capturing mode;
based at least on the suggesting, receive, from the user, a request to process, in the second image capturing mode, the at least one image frame from the received plurality of image frames captured in the first image capturing mode; and
based at least on the requesting, process, using the second image capturing mode, the at least one image frame from the received plurality of image frames captured in the first image capturing mode.

2. The apparatus as claimed in claim 1, wherein the at least one memory further stores program instructions that, when executed by the at least one processor, cause the apparatus to:
after the suggestion and prior to processing the at least one image frame based on the second image capturing mode, receive a second plurality of image frames captured by the digital camera unit in the same capturing session as the received plurality of image frames.

3. The apparatus as claimed in claim 2, wherein the second plurality of image frames are captured in the second image capturing mode.

4. The apparatus as claimed in claim 1, wherein the at least one memory further stores program instructions that, when executed by the at least one processor, cause the apparatus, in response to a determined possibility to combine at least two image frames, to combine at least two image frames from the received plurality of image frames into at least one combined image.

5. The apparatus as claimed in claim 4, wherein the at least one memory further stores program instructions that, when executed by the at least one processor, cause the apparatus to store the combined image in the at least one memory.

6. The apparatus as claimed in claim 4, wherein the at least one memory further stores program instructions that, when executed by the at least one processor, cause the apparatus to display the at least one combined image in an icon on the display as an indication of the possibility to combine the at least two image frames.

7. The apparatus as claimed in claim 4, wherein the possibility to process comprises detecting one of panorama, action shot and motion focus as a possible combination.

8. The apparatus as claimed in claim 3, wherein the possibility to process comprises best shot selection.

9. A method, comprising:
receiving a plurality of image frames captured by a digital camera unit configured to capture images in a first image capturing mode and a second image capturing mode, the plurality of image frames being captured in the first image capturing mode, wherein the plurality of image frames are captured in a same capturing session; and
prior to processing the received plurality of image frames in the first image capturing mode:
analyzing automatically the received plurality of image frames captured in the first image capturing mode;
based at least on the analyzing, suggest to a user, the second image capturing mode to process at least one image frame from the received plurality of image frames captured in the first image capturing mode, the first image capturing mode being different than the second image capturing mode;
based at least on the suggesting, receive, from the user, a request to process, in the second image capturing mode, the at least one image frame from the received plurality of image frames captured in the first image capturing mode; and
based at least on the requesting, processing using the second image capturing mode, the at least one image frame from the received plurality of image frames captured in the first image capturing mode.

10. The method as claimed in claim 9, wherein the method further comprises providing an indication of a possibility to process in response to a determined possibility to post process the at least one image frame.

11. The method as claimed in claim 10, wherein an icon is displayed as the indication on a display.

12. The method as claimed in claim 9, wherein the method further comprises combining at least two image frames from the received plurality of image frames into at least one combined image in response to a determined possibility to combine the at least two image frames.

13. The method as claimed in claim 12, further comprising:
based at least one the suggestion and prior to processing the at least one image frame using second image capturing mode, capturing a second image frame by the digital camera unit in the second image capturing mode in the same capturing session as the received plurality of image frames; and
processing the at least one image frame and the second image frame using the second image capturing mode.

14. A computer readable storage device comprising executable instructions for causing at least one processor of a computing apparatus to perform operations comprising:
receiving a plurality of image frames captured by the digital camera unit configured to capture images in a first image capturing mode and a second image capturing mode, the plurality of image frames being captured in the first image capturing mode, wherein the plurality of image frames are captured in a same capturing session; and
prior to processing the received plurality of image frames in the first image capturing mode:
analyzing, automatically, the received plurality of image frames captured in the first image capturing mode;
based at least on the analyzing, suggest, to a user, the second image capturing mode to process at least one image frame from the received plurality of image frames captured in the first image capturing mode, the first image capturing mode being different than the second image capturing mode;
based at least on the suggesting, receive, from the user, a request to process, in the second image capturing mode, the at least one image frame from the received plurality of image frames captured in the first image capturing mode; and
based at least on the requesting, processing using the second image capturing mode, the at least one image frame from the received plurality of image frames captured in the first image capturing mode.

15. The computer readable storage device as claimed in claim 14, wherein the executable instructions for causing the at least one processor of the computing apparatus to perform operations further comprise providing an indication of a possibility to process in response to a determined possibility to process the at least one image frame.

16. The computer readable storage device as claimed in claim 14, wherein the executable instructions for causing the at least one processor of the computing apparatus to perform operations further comprise displaying an icon as an indication of a possibility to process on a display.

17. The computer readable storage device as claimed in claim 14, wherein the executable instructions for causing the at least one processor of the computing apparatus to perform operations further comprise combining at least two image frames from the received plurality of image frames into at least one combined image in response to a determined possibility to combine the at least two image frames.

18. The computer readable storage device as claimed in claim 17, wherein the executable instructions for causing the at least one processor of the computing apparatus to perform operations further comprise storing the combined image in a memory.

19. The computer readable storage device as claimed in claim 17, wherein the executable instructions for causing the at least one processor of the computing apparatus to perform operations further comprise displaying the at least one combined image in an icon on a display as an indication of the possibility to combine the at least two image frames.

20. The computer readable storage device as claimed in claim 17, wherein the executable instructions for causing the at least one processor of the computing apparatus to perform operations further comprise displaying similar images from the received plurality of image frames.

* * * * *